(12) United States Patent
Lentine, Jr. et al.

(10) Patent No.: US 9,048,482 B2
(45) Date of Patent: Jun. 2, 2015

(54) BATTERY TRAY

(75) Inventors: Frank Lentine, Jr., Tyngsboro, MA (US); John Young, Sutton, MA (US); Jeffrey W. Morin, Hooksett, NH (US); Joseph Roskowski, Boston, MA (US); Daniel Deguire, Blackstone, MA (US)

(73) Assignee: Foster-Miller, Inc., Waltham, MA (US)

( * ) Notice: Subject to any disclaimer, the term of this patent is extended or adjusted under 35 U.S.C. 154(b) by 207 days.

(21) Appl. No.: 13/385,983

(22) Filed: Mar. 19, 2012

(65) Prior Publication Data

US 2013/0244075 A1 Sep. 19, 2013

(51) Int. Cl.
*H01M 2/02* (2006.01)
*H01M 2/10* (2006.01)
*H01M 10/42* (2006.01)

(52) U.S. Cl.
CPC .......... *H01M 2/1077* (2013.01); *H01M 10/425* (2013.01); *H01M 2220/20* (2013.01)

(58) Field of Classification Search
CPC ............................ H01M 2/1077; H01M 10/425
USPC .............................................. 429/99, 159, 153
See application file for complete search history.

(56) References Cited

U.S. PATENT DOCUMENTS

| | | | |
|---|---|---|---|
| 5,021,305 A * | 6/1991 | Turner | 429/65 |
| 6,023,146 A * | 2/2000 | Casale et al. | 320/112 |
| 2003/0037954 A1* | 2/2003 | Wu | 174/92 |
| 2006/0076923 A1* | 4/2006 | Eaves | 320/112 |
| 2007/0238018 A1* | 10/2007 | Lee et al. | 429/159 |

OTHER PUBLICATIONS

Ty Valascho, Comparison of Energy Loss in Talon Battery Trays: "Penn State" and IBAT, Unclassified TARDEC, Technical Report 21795, Apr. 26, 2011, 17pages total, U.S. Army, Warren, Michigan 48397-5000.

\* cited by examiner

*Primary Examiner* — Stewart Fraser
*Assistant Examiner* — Olatunji Godo
(74) *Attorney, Agent, or Firm* — Iandiorio Teska & Coleman, LLP

(57) ABSTRACT

A battery tray includes a bottom plate and opposing end walls extending upward from the bottom plate. Each end wall includes a plurality of inward spaced battery connectors. A retainer is releasably secured to the bottom plate and is configured to retain batteries disposed on the bottom plate and abutting the end walls. At least one printed circuit board in an end wall includes circuitry connecting the battery connectors to the electrical output.

11 Claims, 12 Drawing Sheets

US 9,048,482 B2

BATTERY TRAY

FIELD OF THE INVENTION

The invention relates to battery trays.

BACKGROUND OF THE INVENTION

Multiple batteries are often used to power various devices and systems. In but one example, six military BB-2590 batteries power a mobile robot called the "Talon." See "Comparison of Energy Loss in Talon Battery Trays: Penn State and IBAT", by Ty Valascho, TARDEC Technical Report No. 21795 incorporated herein by this reference. The currently used battery tray for this robot is not fixedly attached to the robot chassis. The batteries reside in the connector side down and the treads of the Talon robot sometimes rub on the battery tray and the tracks wear prematurely. It also allows water to enter the area where the batteries plug into the tray potentially resulting in failures.

SUMMARY OF THE INVENTION

An aspect of this invention, in one example thereof, is to provide a more water resistant, lower profile, and more ruggedized battery tray. In addition, this invention allows easier insertion and securing of the individual batteries A battery tray is featured including a bottom plate, opposing end walls extending upward from the bottom plate, each end wall including a plurality of spaced battery connectors, and a retainer releasably secured to the bottom plate and configured to retain batteries disposed on the bottom plate and abutting an end wall. There may be an electrical output and at least one printed circuit board including circuitry connecting the battery connectors to the electrical output.

One retainer includes a channel member with a bottom wall mateable to the bottom plate of the tray and spaced side walls each including a battery cover member. Preferably, the retainer side walls are biased outwardly. The electrical output may include a cable terminating in a plug. There may be a printed circuit board in the end walls and circuitry which connect the batteries in parallel.

In one version, a gasket is disposed about each battery connector on an end wall. One embodiment features a bottom plate and the end walls are configured to receive six side ways oriented BB type batteries. Each end wall may include a circuit stacking three batteries in series and one end will further includes a circuit stacking six batteries in parallel.

The invention also features a battery tray comprising a bottom plate for edges of a set of batteries, opposing end walls each including inward spaced battery connectors for the top of a subset of the set of batteries, and a channel shaped retainer with a bottom wall securable to the bottom plate of the tray and spaced side walls each urged against the bottom of the batteries.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
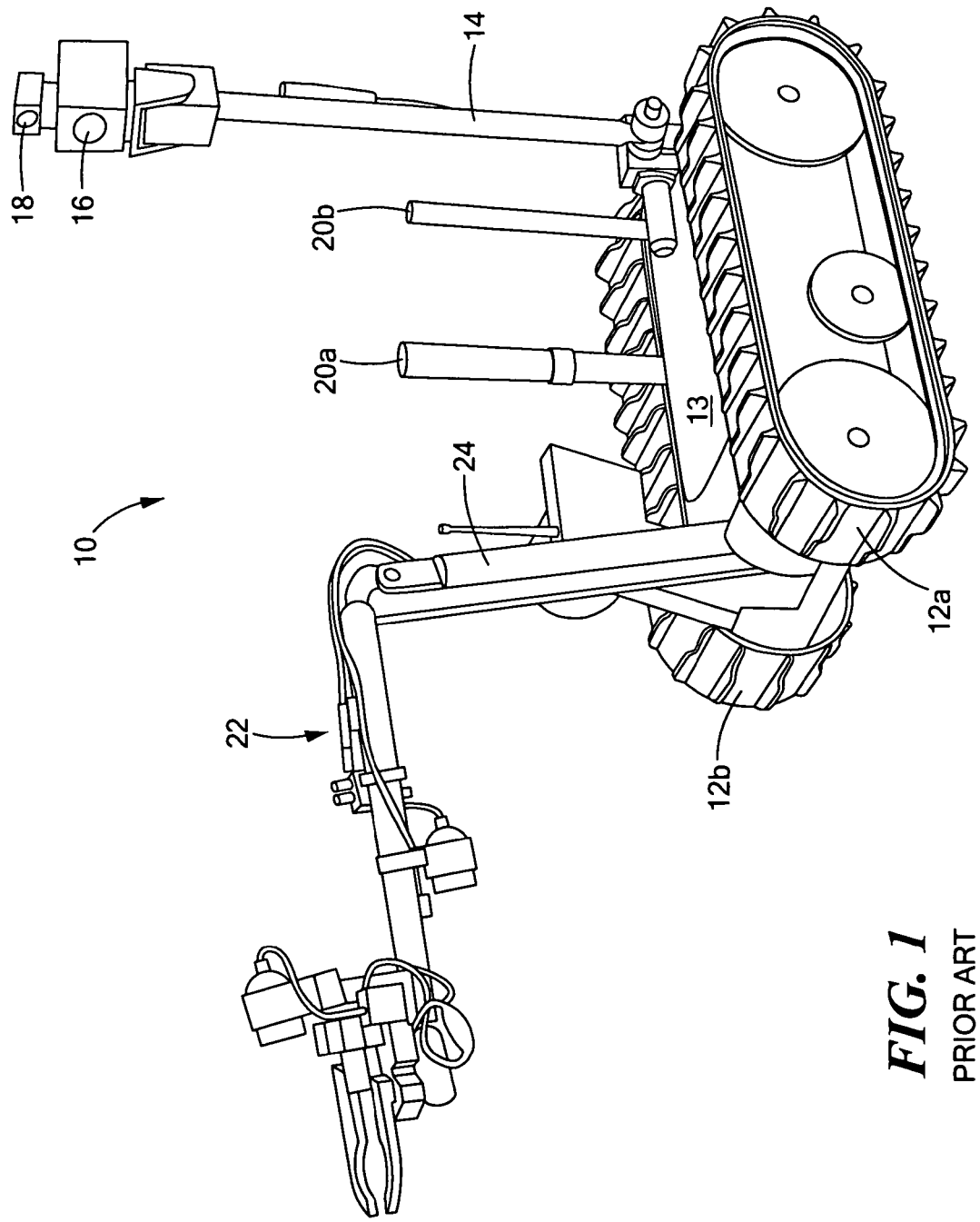
FIG. 1 is a highly schematic three dimensional view of an example of a Talon robot.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 is a depiction of a robot 10 driven by tracks 12a and 12b. The battery tray for this robot typically resides within chassis 13. Other components of robot 10 include deployable mast 14, camera 16, light 18, antennas 20a and 20b, and arm assembly 22.

Figure 2:
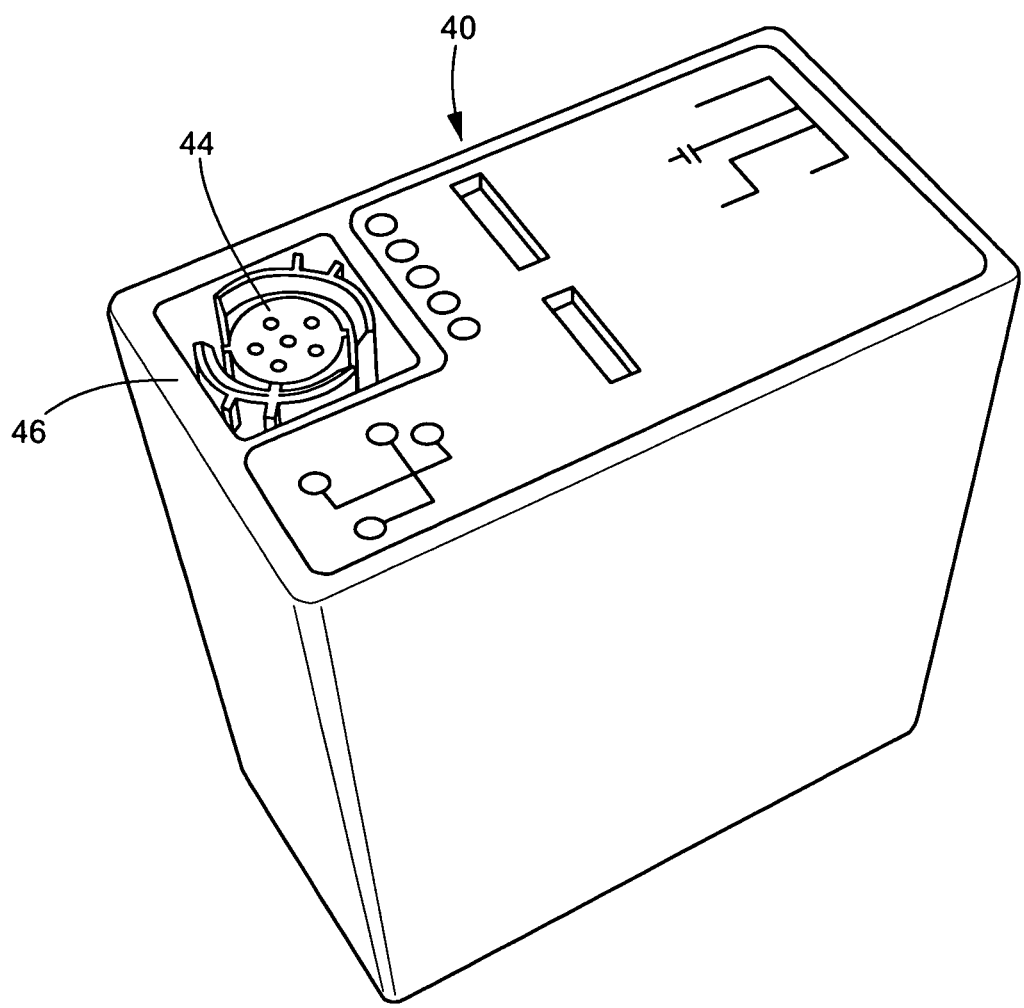
FIG. 2 is a schematic three dimensional view showing the top of a BB2590 battery.

The batteries used are typically military type batteries such as the batteries shown at 40 in FIG. 2, for example, a BB2590 battery, a BB-3590, or a BB-390 battery each of which include female electrical socket 44 surrounded by walls such as wall 46.

Figure 3:
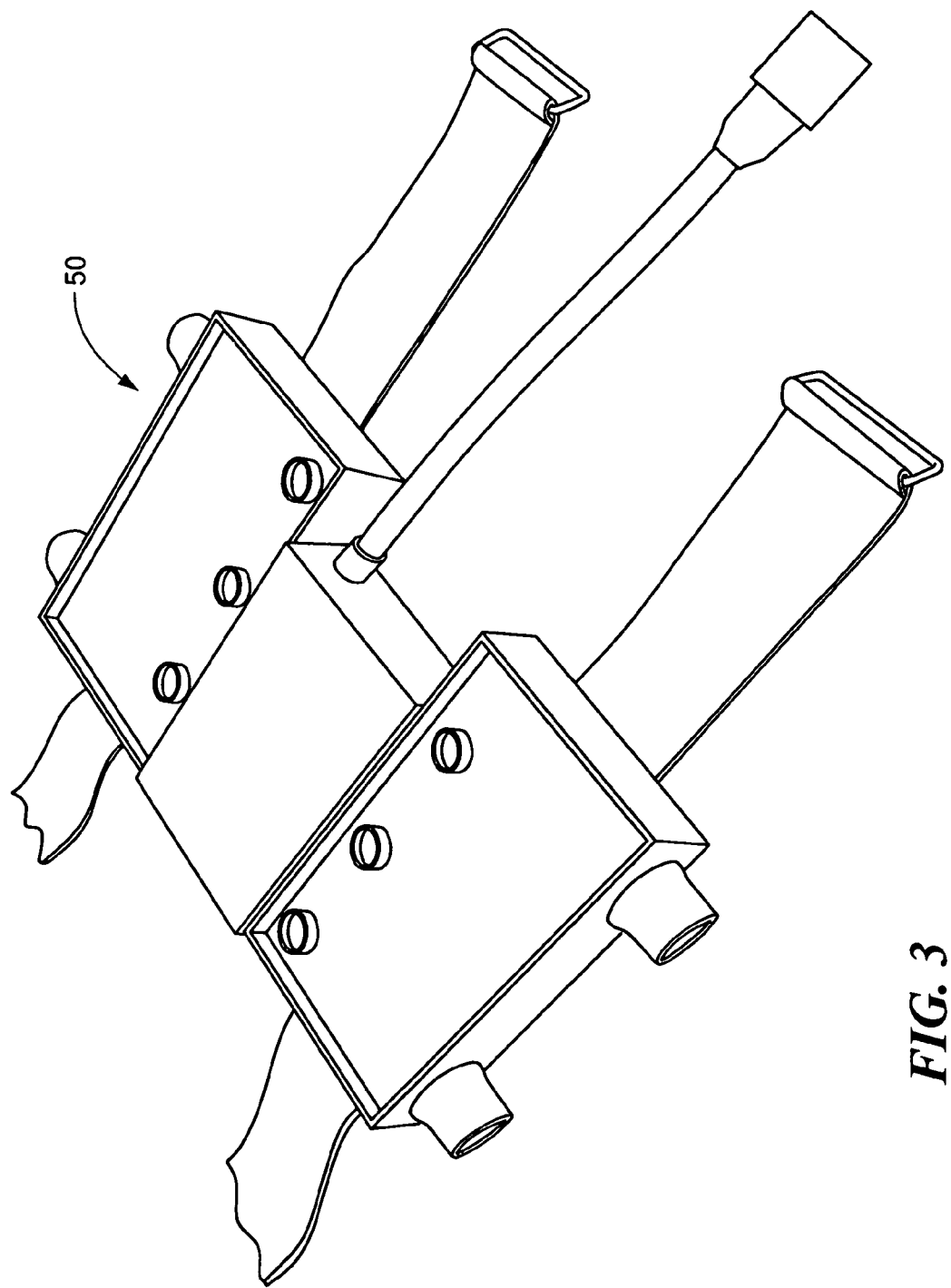
FIG. 3 is a schematic three dimensional top view of the "IBAT" type Talon battery tray.
Figure 4:
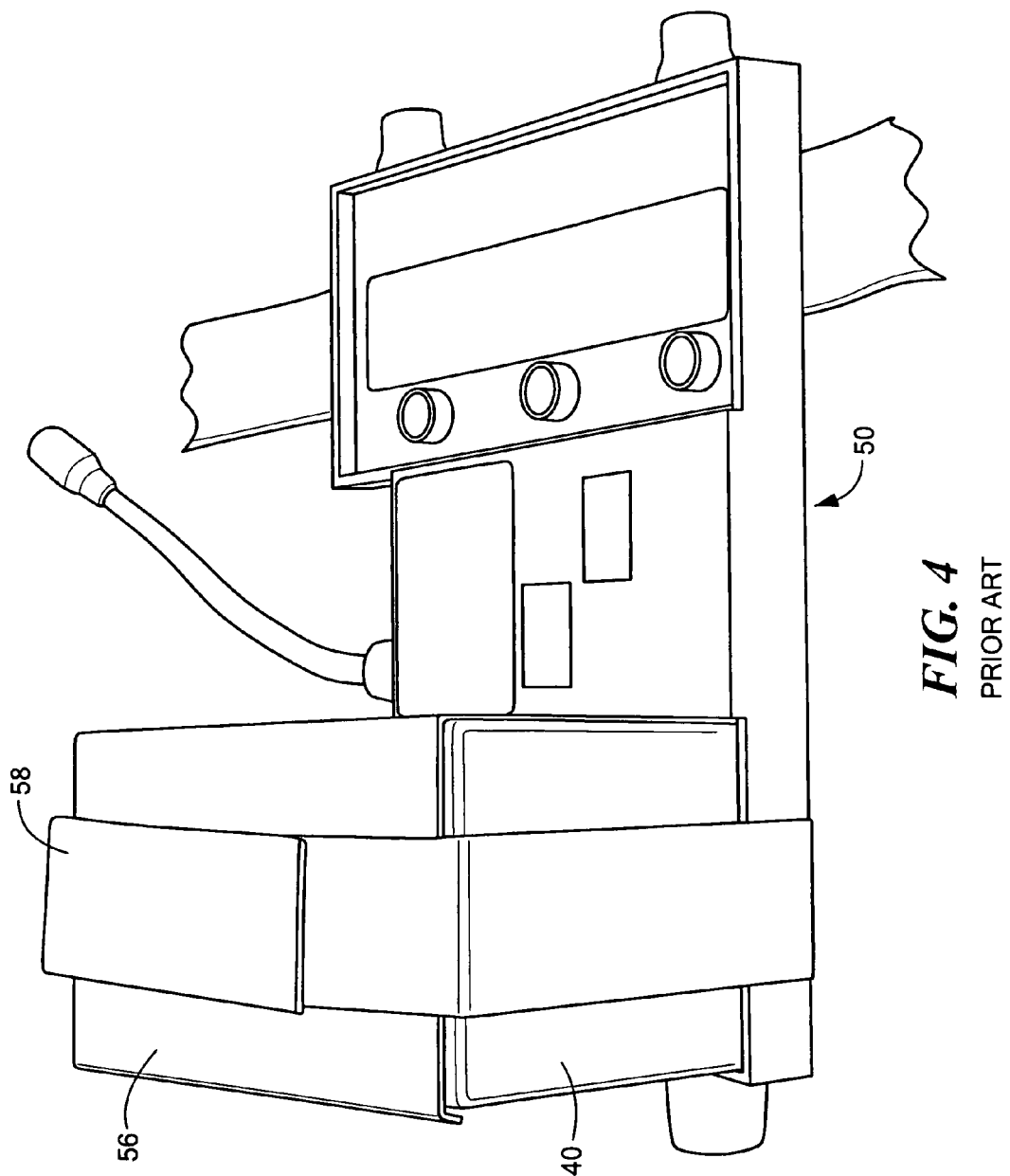
FIG. 4 is a schematic three dimensional view of the battery tray shown in FIG. 3 with three batteries and a cover installed.
Figure 5:
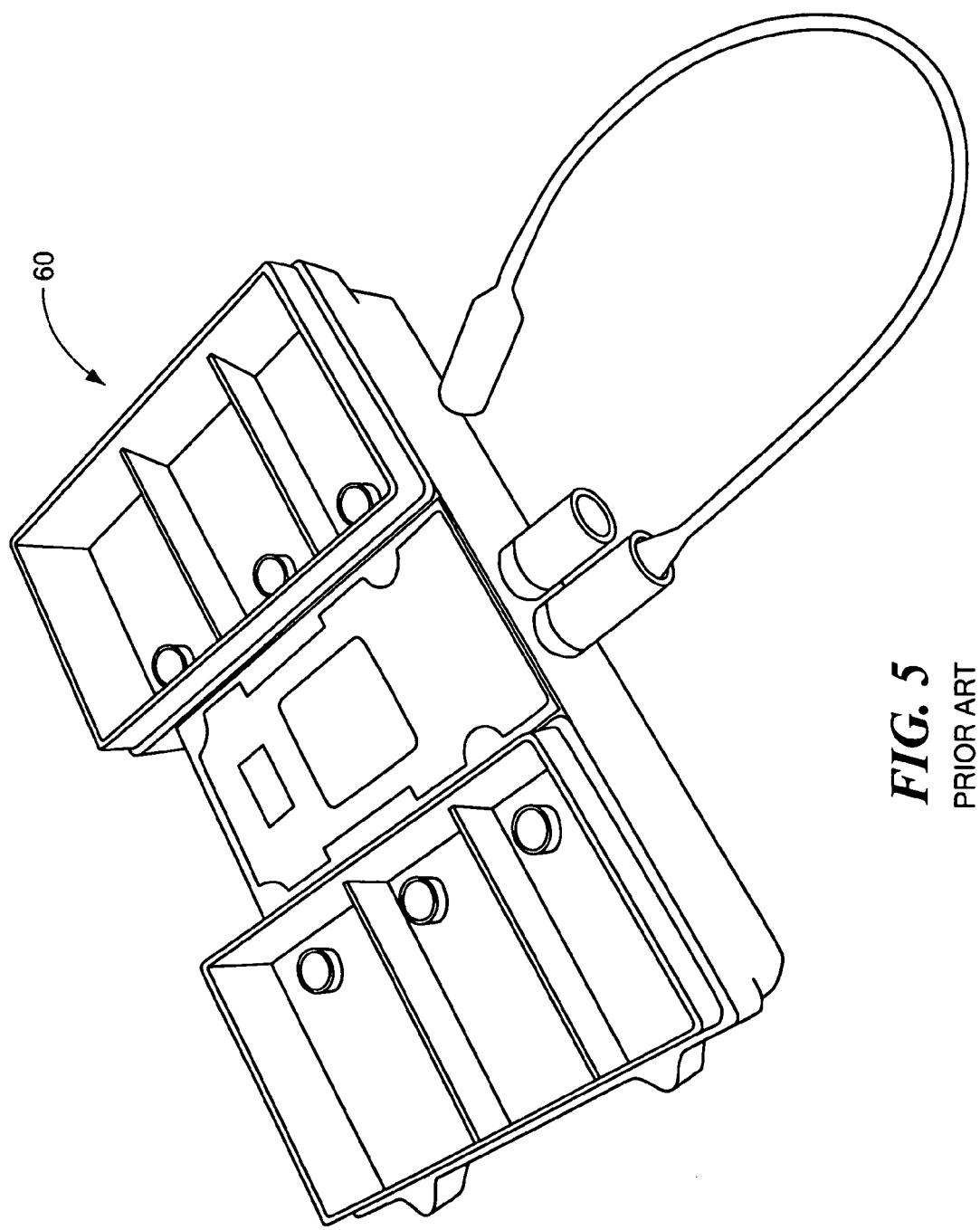
FIG. 5 is a schematic three dimensional top view showing another proposed battery tray for the talon robot.

FIG. 3 depicts prior "IBAT" battery tray 50. FIG. 4 shows how batteries 40 are placed upside down in the battery tray and then secured thereto via cover 56 held in place by velcro strap 58. Another proposed prior art batter tray is shown at 60 in FIG. 5 again designed such that the batteries are placed upside down in the battery tray. In either case, the battery tray was placed in chassis 13, FIG. 1 of robot 10. This vertical orientation of the batteries causes the battery tray to exceed the available payload area and leads to rubbing and premature wear of the robot tracks. The result, in some instances, where the robot is transported in a vertical orientation was the tray becoming dislodged from the robot chassis. In other instances, the electrical connection between the batteries and the tray failed due to water which collects in the tray during deployment of the robot.

Figure 6:
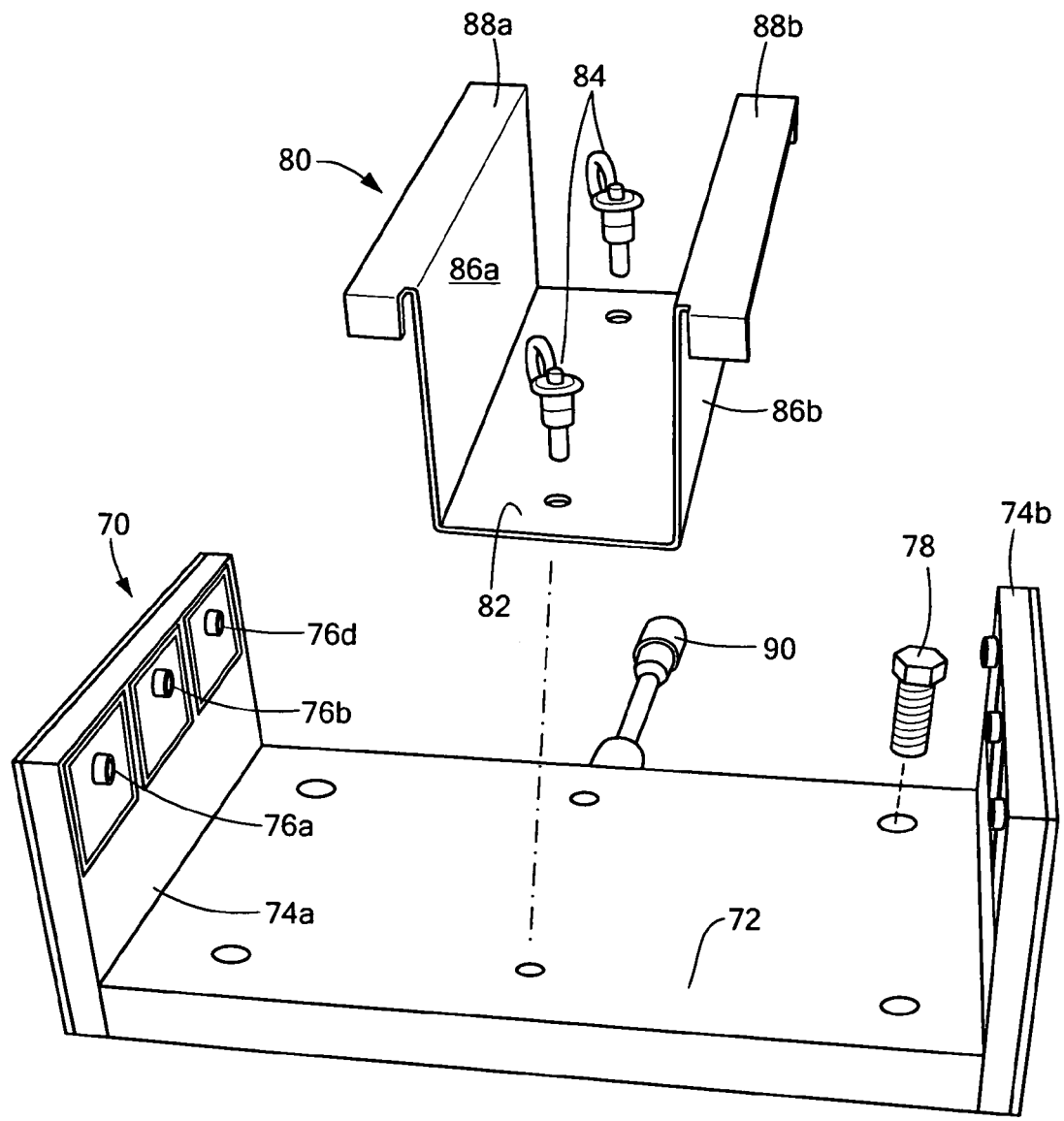
FIG. 6 is a schematic three dimensional exploded front view showing an example of a battery tray according to the invention.

New tray 70, FIG. 6 has bottom or base plate 72 and opposing end walls 74a and 74b extending upward from bottom plate 72 such that each end wall typically includes a plurality (in this example three) spaced male battery connectors 76a, 76b, and 76d as shown for left end wall 74a. In this way, the batteries are retained on their sides with the electrical connection between battery and tray spaced some distance from bottom plate 72 to prevent electrical problems in the case of heavy moisture collection within the robot chassis. Bottom plate 72 itself is preferably secured to the robot chassis via fasteners such as bolt 78. A retainer such as channel member 80 is releasably securable to bottom plate 72 and is configured to retain batteries disposed on bottom plate 72 and abutting end walls 74a and 74b. Here channel member retainer 80 includes bottom wall 82 mateable to bottom plate 72 of tray 70 and secured thereto via quick release fasteners 84. Spaced side walls 86a and 86b each include a battery cover member 88a and 88b, respectively. Sidewalls 86a and 86b are typically biased (for example bent) outwardly in order to urge the batteries in tray 70 into a mated relationship with their respective electrical connectors extending from walls 74a and 74b. Printed circuit boards typically reside in end walls 74a and 74b and function, among other things, to route electrical power from the batteries placed in tray 70 to electrical output 90, in this example, a cable with a plug which is plugged into the robot electrical interface.

Figure 7:
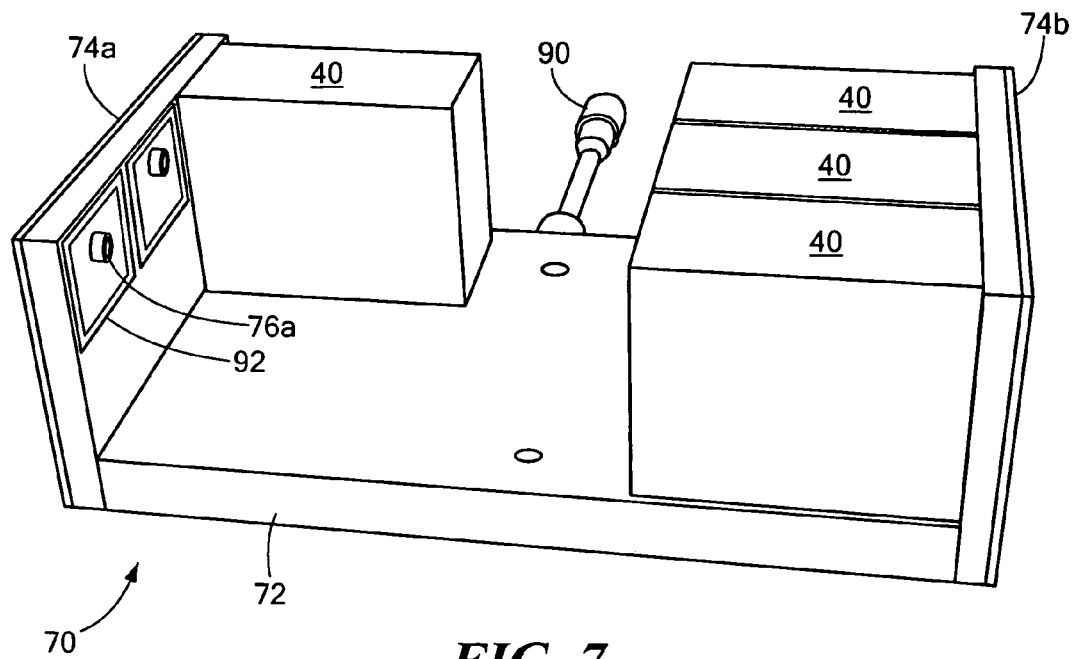
FIG. 7 is a schematic three dimensional front view showing a battery tray in accordance with the invention with four batteries installed.

FIG. 7 shows a version of battery tray 70 with a gasket 92 about connector 76a. The other battery connectors also have a gasket about them designed to mate with the surfaces surrounding the electrical connecter of a typical battery (see surface 46 FIG. 2).

Figure 8:
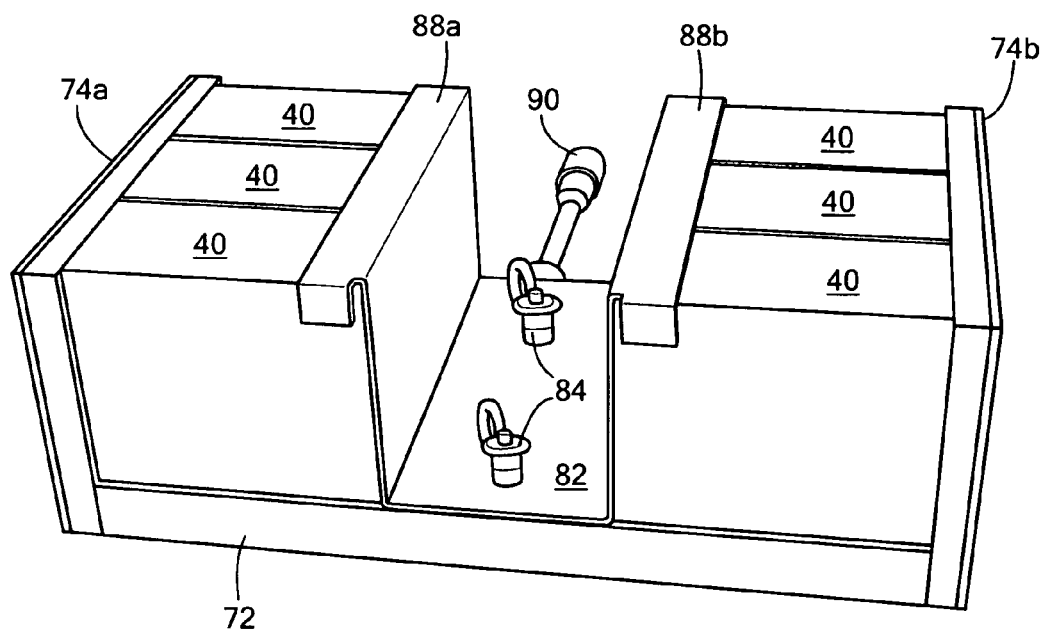
FIG. 8 is a schematic three dimensional front view of the battery tray shown in FIG. 7 now with six batteries and the cover installed.
Figure 9:
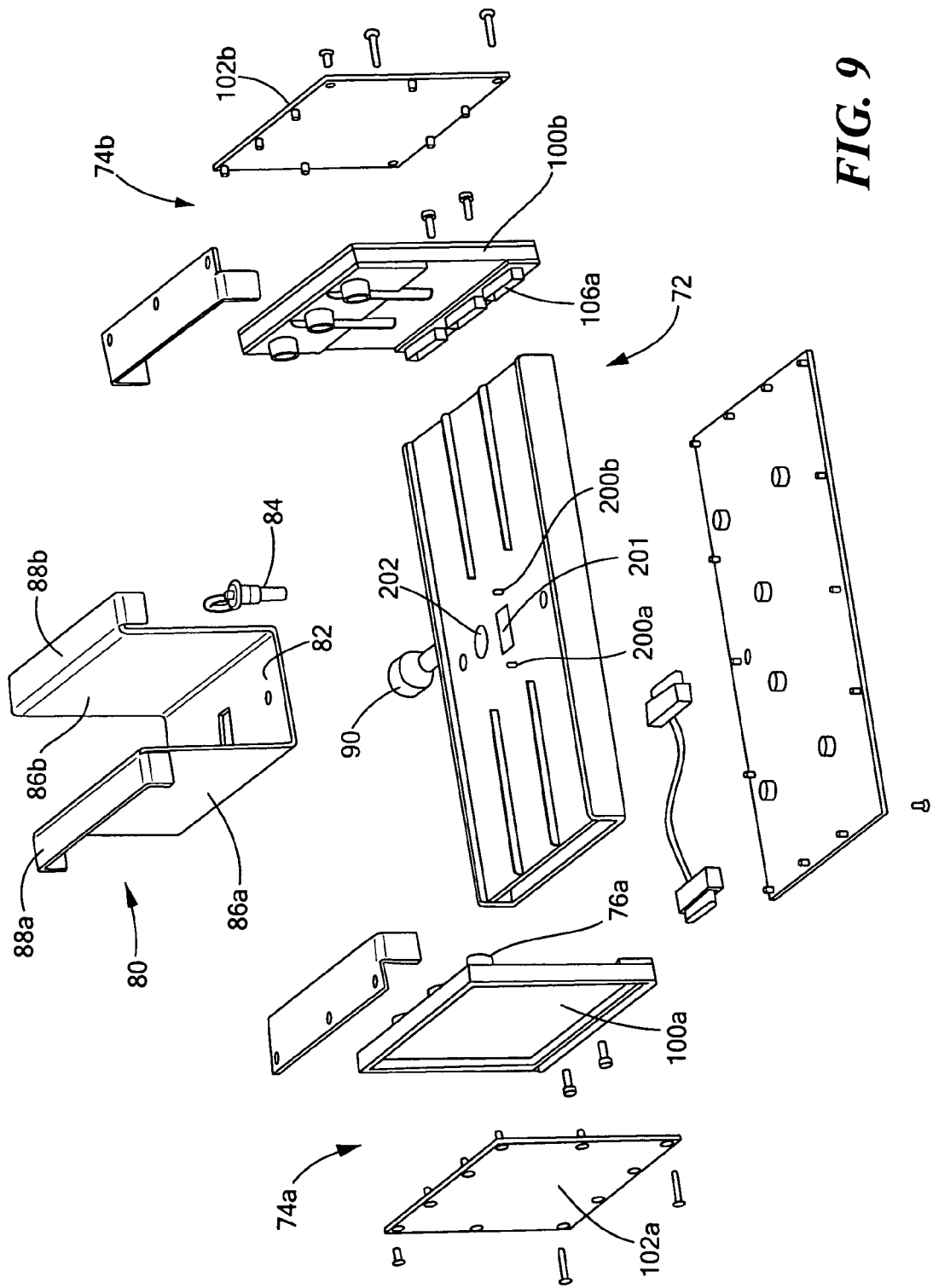
FIG. 9 is a schematic three dimensional exploded view of a battery tray assembly in accordance with the invention.
Figure 10:
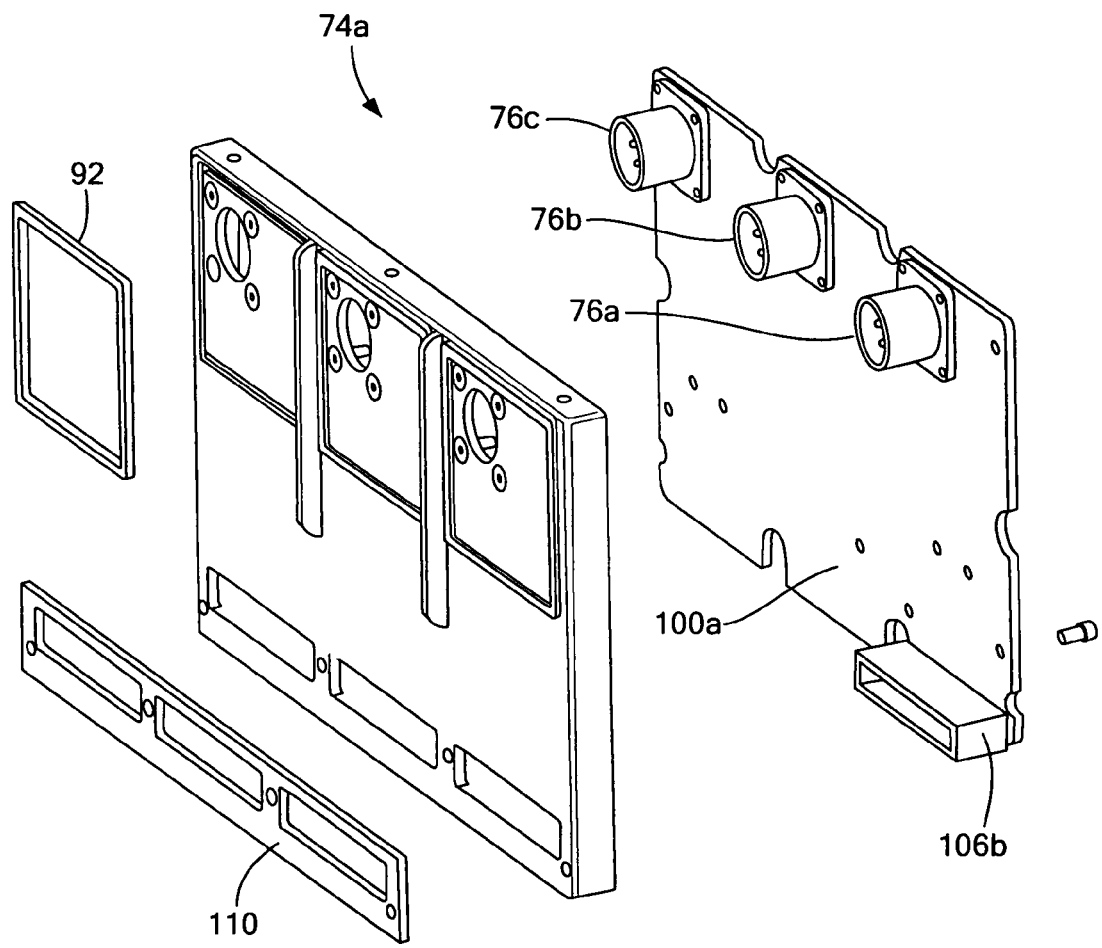
FIG. 10 is a schematic three dimensional exploded side view of the left end wall of the battery tray assembly shown in FIG. 9.
Figure 11:
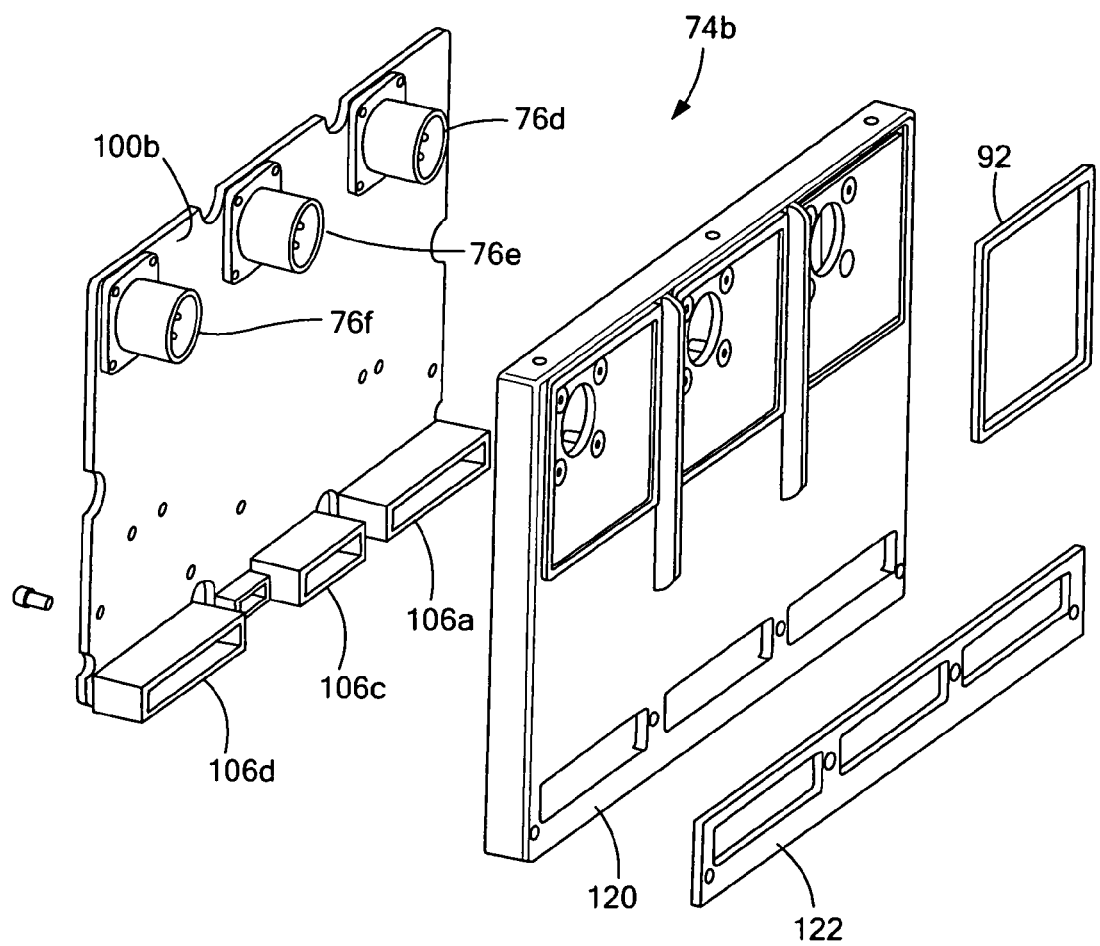
FIG. 11 is a schematic three dimensional exploded side view of the right hand side end plate of the battery assembly shown in FIG. 9.
Figure 12:
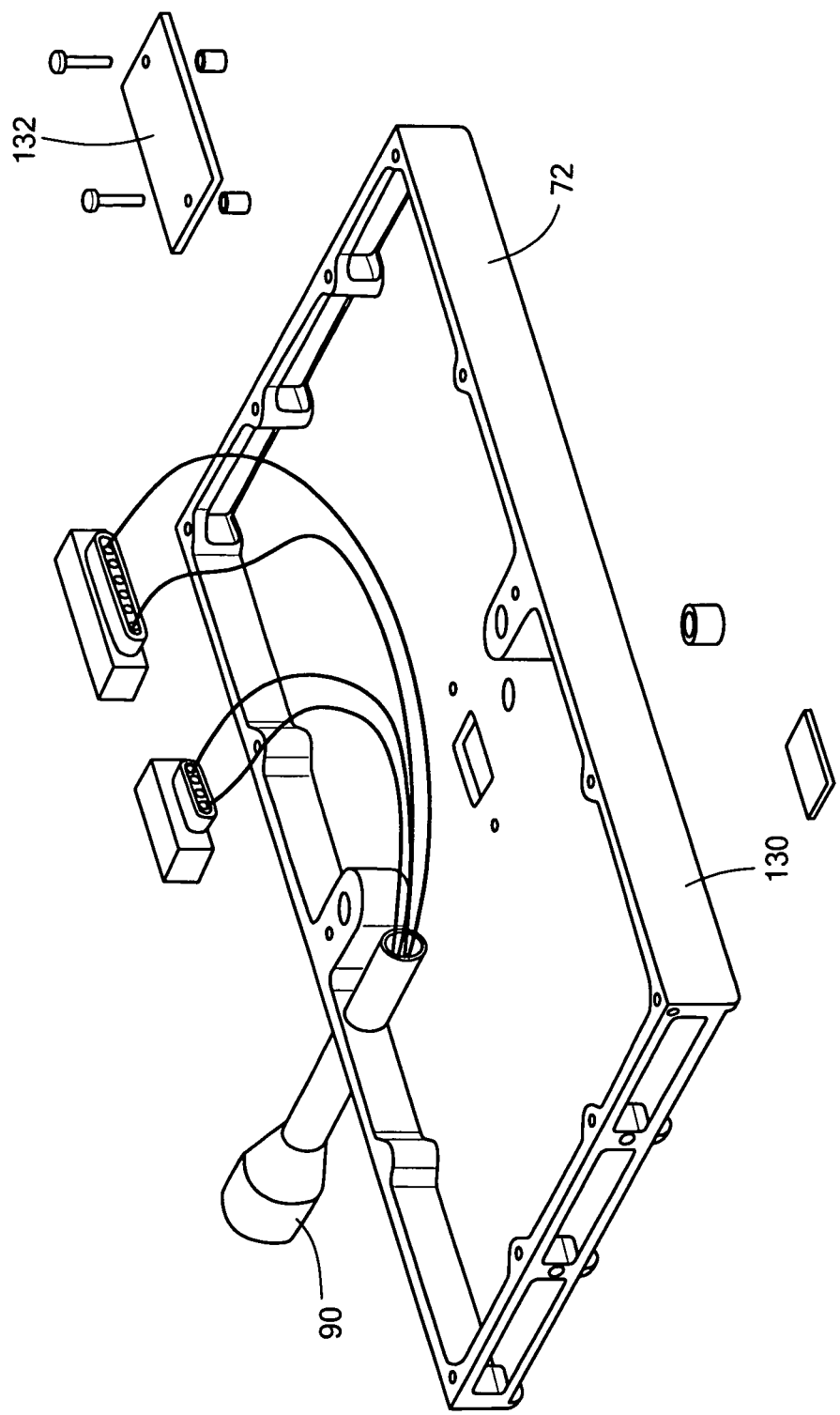
FIG. 12 is a schematic three dimensional exploded front view of the bottom plate of the battery tray assembly shown in FIG. 9.

FIG. 8 shows retaining cover 80 in place locking six batteries in the tray. FIG. 9 shows printed circuit board 100a in left end wall 74a covered by plate 102a. Circuit board 100b is a component of end wall 74b and is covered with plate 102b. Each end wall includes one or more bottom electrical connectors as shown for electrical connector 106 of end wall 74b to route electricity and electronic signals from the battery connectors 76a and the like amongst the various circuit boards. FIG. 10-11 show these connectors in more detail where end wall 74a includes electrical connector 106b on printed circuit board 100a. A lower gasket 110 is provided for this electrical connector as well. Typically the circuitry of the left side end wall is configured to route electricity and electrical signals from the batteries to the circuit board 100b of right side end wall 74b, FIG. 11 for signal conditioning and processing. Typically, this routing occurs via cabling in battery tray bottom wall 72, FIG. 9. FIG. 11 shows end wall battery electrical connectors 76d, 76e, and 76f as well as lower printed circuit board electrical connectors 106a, 106c, and 106d extending through cap 120 and protected by lower gasket 122.

Tray bottom plate 72 includes base 130 with electrical output cable 90 extending therefrom. Display printed circuit board assembly 132 mounts under the screen 201, in baseplate 72, via holes 200a and 200b, FIG. 9 switch 202 shuts off the display.

Figure 13:
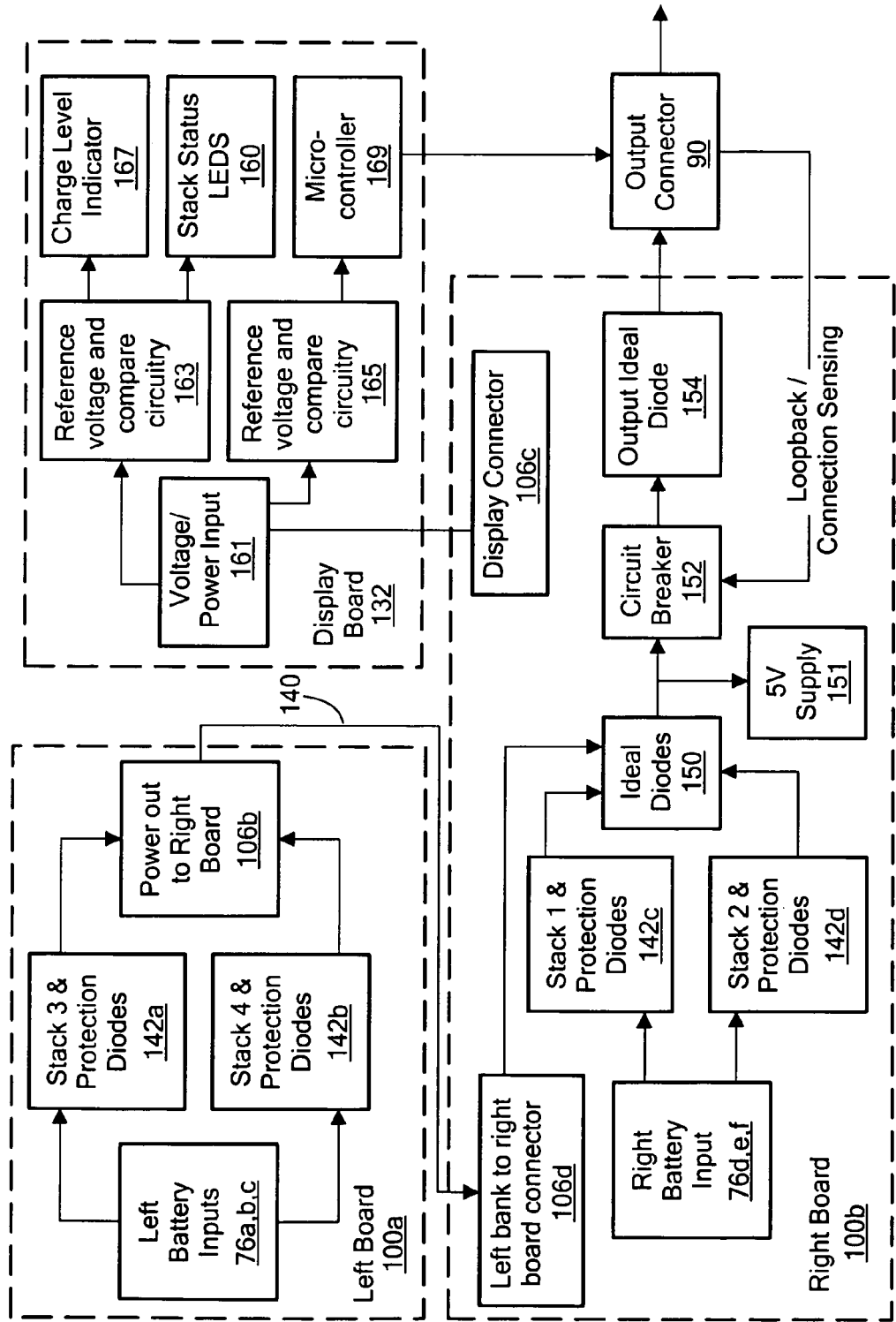
FIG. 13 is a block diagram showing the primary components associated with the circuit boards depicted in FIGS. 10, 11, and 12.

FIG. 13 depicts the primary circuitry associated with each printed circuit board. For example, the printed circuit board in the left hand side end wall 100a includes battery inputs 76 connected via a cable 140 to right hand side end wall printed circuit board 100b. Stacking and protection diode circuitry 142a and 142b may be present between the battery inputs and the power out electrical connector coupled to cable 140. Block 142 takes three battery cells and stacks them in series, with a protection diode in parallel to each cell, protecting them from instances of transient overvoltage. The result is two stacks of three cells each. Cable 140 extends typically through the bottom plate of the tray and to right end wall printed circuit board electrical connector 106b. Again, stacking and diode protection circuitry 142c and 142d may be present. The ideal diodes 150 combine the four "stacks" in parallel and output a voltage equal to that of the highest stack. This circuitry prevents back-feeding voltage from one battery stack to another. The 5V supply 151 takes the output voltage of the ideal diodes and regulates it down to 5 volts. This power supply is used to power circuit breaker circuitry and display circuitry including a microcontroller. Circuit breaker 152 accepts power from the ideal diodes and either disables or enables output power based on a set of criteria. These include over-voltage or under-voltage of the batteries as well as excessive current draw. It also checks that the connector 90 is attached to a vehicle, and disables the output if the pack is disconnected. Output ideal diode 152 and related circuitry passes power from the output of the circuit breaker to the output of the pack. It prevents power from flowing back in to the pack in a situation in which the voltage is higher on the output bus than inside the pack.

Display connector 106 C passes the 5V supply voltage as well a voltage from each stack 1-4 as well as voltage from between the ideal diodes and the circuit breaker from the right board to the display board.

Voltage/Power input 161 accepts the 5V supply as well as voltage from each Stack 1-4 as well as voltage from between the ideal diodes and the circuit breaker from the right board. It also includes a 5V supply that can be disabled by switch 202, FIG. 9 on the pack. The reference voltage and compare circuitry 163 monitors the voltage of each stack as well as the combined voltage. It uses this information to provide reference voltages to the charge level indicator and the stack status LED. This circuitry can be disabled using the switch. Reference voltage and compare circuitry 165 monitors the voltage of each stack as well as the combined voltage. It uses this information to provide reference voltages to the microcontroller. This circuitry is not disabled by the switch.

Charge level indicator 167 inputs a voltage from the reference voltage and compare circuitry 163 and lights a number of different colors on "bar graph" form display based on this input. These leds 167 indicate the combined voltage of the four stacks and therefore the overall pack voltage level.

The stack status LEDs 160 inputs four voltages from the reference voltage and compare circuitry 163 and lights up to four LEDs based on the voltage of each stack. Each LED informs the user of the status of each of individual battery stack, indicating whether or not that stack is functioning and has sufficient charge. Microcontroller 169 inputs five voltages from the reverence voltage and compare circuitry 161. These voltages represent stacks 1-4 as well as the combined voltage, and have been modified appropriately for input to the microcontroller. The microcontroller runs an analog to digital conversion on each of the five voltages, and presents a serial communication port to the outside world via the pack output connector. This connection allows a vehicle or other device to query the type of pack as well as the status of the five voltages. Connector 90 provides power from the pack. It also provides serial communications to and from the pack, and informs the circuit breaker if the pack is connected to a vehicle.

The result is a more ruggedized tray designed to keep the batteries tight against their respective end walls. Locking the batteries down is easier than using velcro straps and awkward covers. Further, the result is a lower profile design so the batteries now rest on their sides instead of on their tops. Wear of the robot tread due to rubbing on the pack should decrease. Also, the battery tray of the invention is more water resistant since the electrical connectors between the tray and the batteries are up off the tray floor and on vertical end walls. Additionally, the pack can be mounted to the robot floor preventing the pack from falling out when the robot is transported vertically.

Still, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A battery tray comprising:
   a bottom plate;
   opposing end walls extending upward from the bottom plate, each end wall including a plurality of spaced battery connectors;
   a battery retainer releasably secured to the top surface of the bottom plate between the opposing end walls thereof and configured to retain batteries disposed on the top surface of the bottom plate and abutting a said end wall by a battery cover member extending at least partially over the top surface of the batteries;
   an electrical output; and
   at least one printed circuit board including circuitry connecting the battery connectors to the electrical output.

2. The battery tray of claim 1 in which the retainer includes a channel member with a bottom wall mateable to the top surface of the bottom plate of the tray and spaced upwardly extending side walls each including a transversely extending battery cover member.

3. The battery tray of claim 2 in which the retainer side walls are biased outwardly.

4. The battery tray of claim 1 in which the electrical output includes a cable terminating in a receptacle or plug.

5. The battery tray of claim 1 in which there is a said printed circuit board in one said end wall.

6. The battery tray of claim 1 further including circuitry which connects the batteries in a series/parallel combination.

7. The battery tray of claim 1 further including a gasket about each battery connector on an end wall.

8. The battery tray of claim 1 in which the bottom plate and end walls are configured to receive six side ways oriented BB type batteries.

9. The battery tray of claim 8 in which each end wall includes a circuit stacking three battery cells in series.

10. The battery tray of claim 9 in which one end wall further includes a circuit combining four battery cell stacks in parallel each three cells in series.

11. A battery tray comprising:
    a bottom plate configured for multiple batteries each with a female electrical socket;
    opposing end walls extending upward from the top surface of the bottom plate, each end wall including a plurality of spaced male battery connectors;
    a battery retainer releasably secured to the top surface of the bottom plate between_said opposing end walls and configured to retain batteries disposed on the bottom plate and abutting a said end wall by a battery cover member extending at least partially over the top of the batteries;
    an electrical output; and
    a printed circuit board inside each said end wall including circuitry connecting the male battery connectors to the electrical output.

\* \* \* \* \*